United States Patent [19]

Leunig et al.

[11] 4,400,186
[45] Aug. 23, 1983

[54] CONSTANT TENSION DEVICE FOR FILTER BAG

[75] Inventors: Carl V. Leunig, Glenmont, N.Y.; Stewart W. Smith, Springfield, Mass.

[73] Assignee: Albany International Corporation, Menands, N.Y.

[21] Appl. No.: 303,148

[22] Filed: Sep. 17, 1981

[51] Int. Cl.³ .............................................. B01D 46/02
[52] U.S. Cl. ....................................... 55/379; 55/508; 267/74; 267/173; 267/178
[58] Field of Search ................ 55/365, 378, 379, 492, 55/508; 267/173, 178, 74, 71, 20 R

[56] References Cited

U.S. PATENT DOCUMENTS

| | | | |
|---|---|---|---|
| 1,380,780 | 6/1921 | Dahlstrom | 267/20 R |
| 2,010,898 | 8/1935 | Ruemelin | 55/379 |
| 2,552,695 | 1/1971 | Liesegang | 267/173 X |
| 2,710,726 | 6/1955 | Messing | 267/173 X |
| 3,710,559 | 1/1973 | Harris et al. | 55/378 X |
| 4,006,873 | 2/1977 | Berger | 267/173 X |
| 4,113,455 | 9/1978 | Richmond | 55/378 |

*Primary Examiner*—Kathleen J. Prunner
*Attorney, Agent, or Firm*—Kane, Dalsimer, Kane, Sullivan and Kurucz

[57] ABSTRACT

A constant tension device is provided for use with a filter bag. The device includes a spring and a linkage assembly for applying tension to the filter bag. The linkage assembly is designed such that a substantially constant tension is applied to the bag regardless of the force exerted by the spring. A pair of lever arms is included within the linkage assembly for applying pressure to a bag cap if the device is used within the filter bag.

18 Claims, 3 Drawing Figures

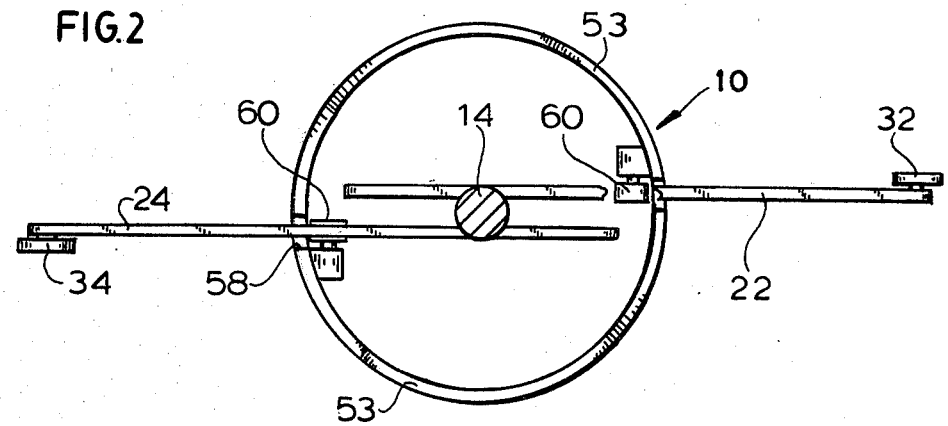
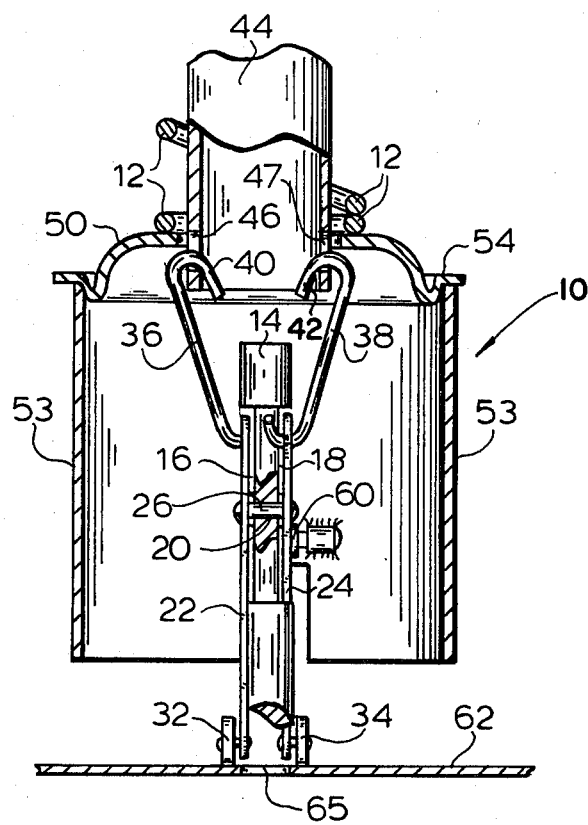

CONSTANT TENSION DEVICE FOR FILTER BAG

BACKGROUND OF THE INVENTION

The field of the invention relates to constant tension devices, particularly as used in conjunction with filter bags.

Electric utilities and industrial companies have been largely responsible for the increasing use of fiberglass filter bags for removing particulates from boiler flue gas. As discussed in an article entitled "Make fiberglass filter bags last longer by maintaining proper tension" in the March, 1980 issue of *Power*, it has been found that premature bag failure can be avoided with proper and uniform tensioning methods. Insufficient tension contributes to abrasion, flex failures, and plugging of the fabric. Loose bags tend to rub against each other or against baghouse walls and results in surface abrasion. Flex failures occur due to the bending or flexing of the bottom portion of the bag. If the insufficient tension inhibits reverse air flow, the bag may not be cleaned properly and will remain plugged.

Excessive tension causes failures in fixed or anchored portions of the bag. Openings may develop in the fabric causing the high-velocity flue gas to sandblast adjacent bags.

It has been found that although a bag may be properly tensioned initially, the tension will decrease as the bag tends to elongate. An 11.5-inch-diameter bag will be subjected to a tension of 70 to 75 pounds. Due to this tension, the bag will increase in length due to some elongation of the fibers themselves, thermal expansion or fabric take-up. Since the bags may commonly be 20-30 feet in length, elongation of several inches may be expected.

Conventional filter bag tensioning devices utilize springs which, because of their non-linear force diagrams, make it impossible to maintain a constant tension on the bag. Instead, as the bag material creeps or stretches, tension is reduced. On retensioning, due to the high spring rates employed, the tension is sometimes increased to a point which causes excessive creep or stretch. A subsequent reduction in bag life and performance accordingly results.

The conventional tensioning spring is typically positioned between a support within the bag house and a bag cap secured to the top of the filter bag. A cable or chain may be employed for securing the spring to the cap and support. The opposite end of the bag is secured to a lower support of the baghouse.

SUMMARY OF THE INVENTION

A constant tension device is provided for applying constant tension to a filter bag even if it stretches several inches beyond its original length. The device is capable of providing a desired tension over a predetermined range of motion. An accurate initial setting of bag tension is accordingly possible as a setting anywhere within the predetermined range of the device will produce acceptable results. As the bag stretches from the initial setting due to factors such as tension and heat, a substantial constant tension is maintained.

The constant tension device includes a spring, pressure transmitting means having a pair of lever arms pivotally mounted to means for adjusting the force of the spring such as a rod, and means for connecting said lever arms to the spring comprising a linkage system. When mounted within a filter bag having a surface such as a bag cap, the lever arms bear against the cap while the rod extends therethrough. Tension is applied to the bag by means of the lever arms as a force is exerted by the rod. The interaction of the spring and linkage system results in a substantially constant force over a given range of motion thereof. A substantially constant bag tension is accordingly provided even when the bag stretches a few inches.

In a broader sense, the invention is directed to a tensioning device which varies the mechanical advantage by which the force of a spring is applied to a filter bag. When the displacement is such that the spring force is high, the mechanical advantage will also be high. When the spring force is low, the mechanical advantage is low. A substantially constant force is accordingly applied to the bag whether the spring force is relatively high or low.

The invention may be used within the filter bag itself to maximize the surface area of the filter bag within the baghouse. It may also be employed outside the bag either attached to the bag or the baghouse structure.

BRIEF DESCRIPTION OF THE DRAWINGS

FIG. 2 is an end view of the tensioning device shown in FIG. 1;

FIG. 3 is a sectional side elevation view of the tensioning device of FIG. 1 rotated ninety degrees.

DETAILED DESCRIPTION OF THE INVENTION

Figure 1:
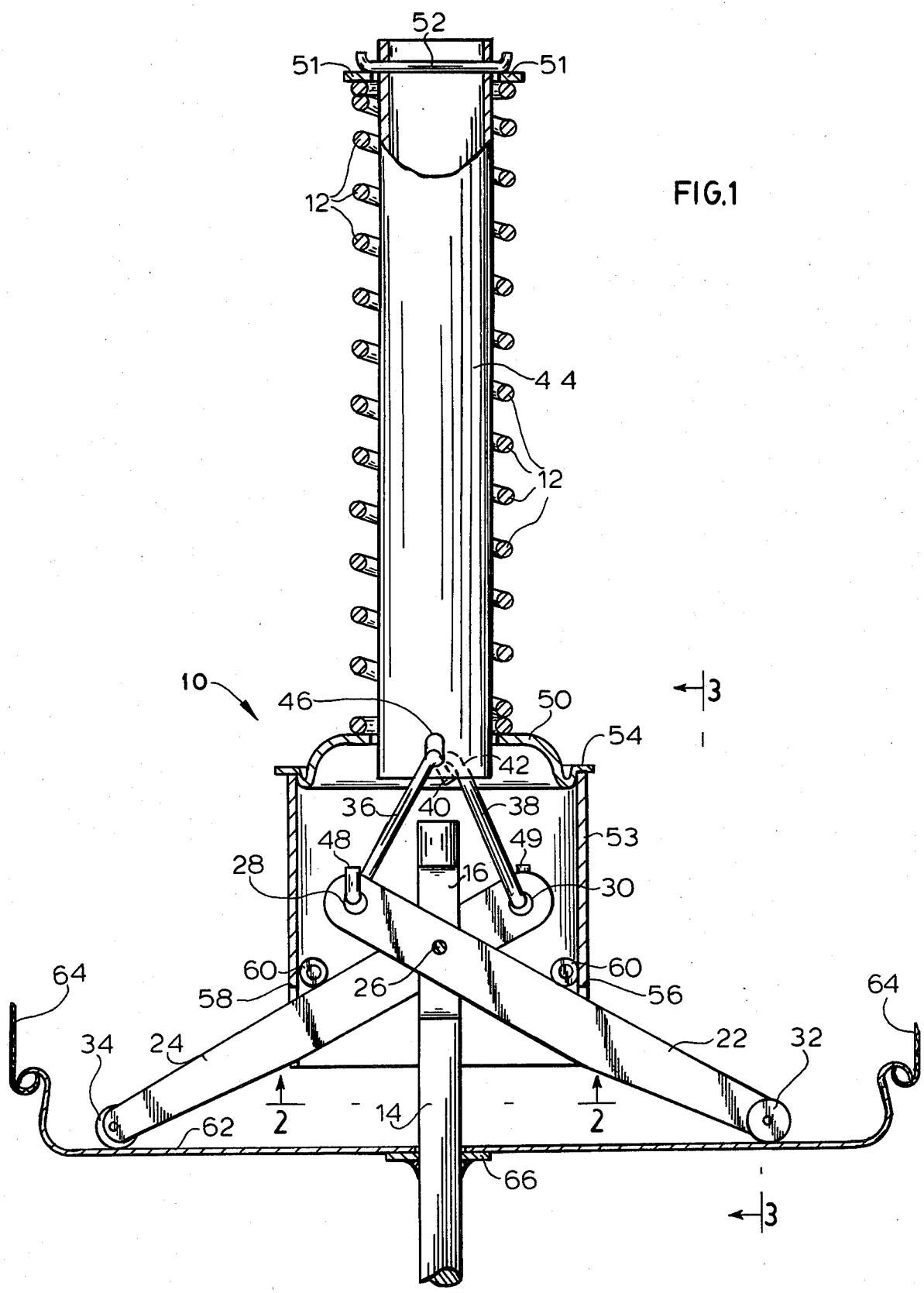
FIG. 1 is a sectional elevation view of a filter bag including a tensioning device according to the invention.

The filter bag tensioning device 10 according to the invention comprises a conventional coil spring 12 having a linkage assembly associated therewith. The linkage assembly includes an eyebolt 14 which is colinear with the longitudinal axis of the spring. A portion of the eyebolt is flattened on opposite sides to form a pair of flat surfaces 16,18. These surfaces are substantially parallel to each other. A hole 20 extends between the flat surfaces and passes through the axis of the eyebolt 14.

A pair of substantially identical lever arms 22, 24 is secured to the eyebolt by means of a shoulder rivet 26 passing therethrough and through the hole 20. Each arm 22, 24 has an eyehole 28, 30 near one end thereof. Rollers 32, 34 are secured to the respective opposite ends of the arms 22, 24.

A connecting means is secured to one end of the compression spring 12 and extends between said one end and respective ends of said lever arms, said connecting means comprising a substantially rigid pair of wires 36,38 connected between said lever arms and an end of a tubular mandrel 44, said tubular mandrel end being engaged by said one end of said spring. Each end of the wires 36, 38 is formed into a hook. The hooks 40, 42 at the first respective ends engage the mandrel 44 by means of a pair of opposing holes 46, 47 therein. The hooks 48, 49 at the second respective ends of the wires engage the respective eyeholes 28, 30 of the lever arms. Each wire has a bend near one end of the spring to allow the hooks 48, 49 to pass through these eyeholes.

A first radially projecting flange washer 50 is seated at one end of the spring. A second flat washer 51 is seated at the opposite end. The mandrel 44 extends through the opening in the flat washer 51. A locking pin 52 extending through opposing holes within the mandrel maintains the flat washer in position despite the force of the spring. A cylindrical tube 53 bears against the flange 54 of the first washer 50. The tube 53 includes a pair of slots 56, 58 through which the lever arms extend. The slots provide a means of guiding the movement of the lever arms and restrict the movement of the arms to a single plane as the eyebolt moves up or down along the axis of the tube. A pair of rollers 60 secured to the tube 53 above the slots forms contact members which minimize friction between the lever arms and the tube. A friction-free surface could alternatively be used in place of the rollers.

The rollers 32, 34 mounted to the ends of the lever arms are in contact with the substantially rigid cap 62 of a filter bag 64 providing means for conveying the spring pressure to the bag. As the lever arms pivot along the axis of rivet 26, the rollers allow the lever arms to move radially along the cap with minimal frictional loss.

The cap 62 includes a central aperture 65 through which the eyebolt 14 extends. A nut may be provided on a supporting structure of the baghouse for adjusting the position of the eyebolt. Shoulder 66 which is larger than aperture 65 limits the vertical movement of the eyebolt 14 within the filter bag 64.

The tensioning device may be used in any of several different ways to apply a substantially constant tension to a filter bag. As shown in the drawings, the device may be positioned within the bag. This allows a maximum filtration area to be exposed within a baghouse as none of the area therein is occupied by the device. A dust protector may be employed to shield the device from particles. Alternatively, the tensioning device may be positioned outside the bag.

In normal use, it is contemplated that the eyebolt will be adjustably secured to a first support within the bag house while the opposite end of the filter bag is fixedly secured to a second support which is parallel to the first. The first support is usually positioned above the second.

The constant tension device 10 is based upon the summation of moments about a point, summation of forces about different axes, and other geometrical considerations. The forces in the device, applied through the eyebolt 14 and the compressed spring 12, are balanced in such a way that the device allows travel of the eyebolt 14 through the cap 62 while maintaining an almost constant force on the eyebolt. As the eyebolt moves, the lever arms 22, 24 slide across the cap encountering virtually no friction. The absence of friction allows the forces to be applied parallel to and in the plane of the force on the eyebolt, and results in moment equations about the lever arms that are statically determinate.

The tension device 10 becomes inactive only when the lever arms 22, 24 bottom on the end cap 62. A visual reference line may be incorporated into the eye bolt stem to indicate when resetting is necessary. The device is fail safe in that hook retention exists on spring or activation rod failure since the lever arms will stop on the cover.

In operation, the filter bag 64 is fixedly secured to a first support on the end opposite from the tension device while the eyebolt is secured to a second support. The bag is pre-tensioned by adjusting the eyebolt to a desired position with respect to the cap. The visual reference line is helpful in accurately adjusting the eyebolt. Since a new bag will be expected to expand, the tension device should be set such that the device remains within its operable limits after such expansion occurs. This insures that tension on the bag will be substantially constant. Setting the device anywhere within the design stroke of the eyebolt will provide an accurate tensioning setting.

As the bag elongates, the lever arms will pivot about rivet 26 and the distance between rollers 32 and 34 decreases. The eyebolt 14 accordingly moves further into the filter bag until its shoulder 66 contacts the bag cap 62. In other words, the rollers 32, 34 remain in contact with the cap applying substantially constant pressure thereto even though the bag has increased in length. Once the shoulder 66 contacts the cap 62, the device should be readjusted to insure it is operating within the desired range.

It will be appreciated that the constant tension device 10 operates by controlling the magnitude of the force applied by rollers 32, 34 to the bag cap. If spring 12 is compressed to an initial setting, it will apply a force to washers 50, 51 which is proportional to the amount it is compressed from its rest position. As the bag expands, the spring also expands and accordingly exerts a lower force. The linkage assembly of the present invention is designed such that when the spring force is high, a relatively smaller portion of that force is applied to the bag cap as opposed to when the spring force is low. A substantially constant bag tension is accordingly obtained.

What is claimed is:

1. In a filtering assembly comprising a filter bag, a bag cap secured to said filter bag, and an opening within said bag cap, the improvement comprising:
    spring means within said filter bag;
    pressure transmitting means connected to said spring means and contacting said bag cap for applying pressure to said bag cap as a function of a spring force exerted by said spring means, said pressure transmitting means including means for varying the mechanical advantage through which the spring force is exerted upon said bag cap by said pressure transmitting means such that when said spring force is relatively high, the mechanical advantage is relatively high, and when said spring force is relatively low, the mechanical advantage is relatively low, thereby resulting in a substantially constant pressure being applied by said pressure transmitting means to said bag cap even if the spring force exerted by said spring means changes; and
    means for adjusting the spring force exerted by said spring means, said adjusting means extending through said opening within said bag cap.

2. The invention according to claim 1 in which said spring means is a compression spring which exerts an increasing force as a function of the amount it is compressed; and said pressure transmitting means includes a pair of lever arms pivotally connected to said adjusting means and in criss-crossing relation to each other, each of said lever arms having an end portion contacting said bag cap and applying a force thereto as a function of the spring force, means for connecting said lever arms to said compression spring such that when said compression spring increases in length, the end portions of said lever arms contacting said bag cap are drawn closer together.

3. The invention according to claim 2 wherein each of said lever arms includes a roller secured to said end portions thereof contacting said bag cap, said rollers contacting said bag cap.

4. The invention according to claim 2 further including means for guiding the movement of said lever arms.

5. The invention according to claim 1 wherein said spring means is a compression spring which exert an increasing force as a function of the amount it is compressed, said compression spring having a first end and a second end; said adjusting means is a rod; and said pressure transmitting means comprises:
- a pair of criss-crossing lever arms pivotably secured to said rod, each of said lever arms having a first end in contact with said bag cap and a second end opposite said first end;
- a flanged member with flanges, said member contacting the first end of said compression spring;
- a substantially cylindrical member having one end in contact with the flanges of said flanged member and an opposite end including a pair of slots extending therein, said rod extending along the axis of said cylindrical member, said lever arms extending, respectively, through said slots;
- connecting means extending between and secured to the second end of said compression spring and said respective second ends of said lever arms.

6. The invention according to claim 5 wherein said rod passes through an aperture of the filter bag cap and has a shoulder larger than said aperture for limiting its movement into the filter bag.

7. The invention according to claim 5 wherein the connecting means includes a pair of wires and a tubular mandrel, said wires connecting said lever arms and said tubular mandrel, and said tubular mandrel being secured to the second end of said compression spring.

8. The invention according to claim 5 further including first and second rollers mounted to said cylindrical member adjacent each slot, respectively, said rollers contacting said respective lever arms.

9. A filtering assembly of a filter bag and a constant tensioning device for maintaining the filter bag under a substantially constant tension, said device comprising:
- spring means;
- means for adjusting the force exerted by said spring means;
- pressure transmitting means connected to said spring means for applying pressure to a surface of the filter bag as a function of a spring force exerted by said spring means, said pressure transmitting means including means for varying the mechanical advantage through which said spring force is exerted upon said pressure transmitting means such that when said spring force is relatively high, the mechanical advantage is relatively high, and when said spring force is relatively low, the mechanical advantage is relatively low, thereby resulting in a substantially constant pressure being applied by said pressure transmitting means even if the spring force exerted by said spring means changes; and
- means for conveying the pressure applied by said pressure transmitting means to said filter bag, thereby maintaining said bag under substantially constant tension.

10. A device as defined in claim 9 wherein said spring means is a compression spring which exerts an increasing force as a function of the amount it is compressed; and said pressure transmitting means includes a pair of lever arms pivotally connected to said adjusting means and in criss-crossing relation to each other, each of said lever arms having an end portion in contact with said surface for appying pressure to the surface, and means for connecting said lever arms to said compression spring such that when said compression spring increases in length, the end portions of said lever arms are drawn closer together.

11. A device as defined in claim 10 wherein each of said end portions of said lever arms includes a roller.

12. A device as defined in claim 10 including means for guiding the movement of said lever arms.

13. A device as defined in claim 9 wherein said spring means is a compression spring which exerts an increasing force as a function of the amount it is compressed, said compression spring having a first end and a second end; said adjusting means is a rod; and said pressure transmitting means comprises:
- a pair of criss-crossing lever arms pivotably secured to said rod, each of said lever arms having a first end contacting said surface of the filter bag for applying pressure thereto and a second end opposite said first end;
- a flanged member contacting the first end of said compression spring;
- a substantially cylindrical member having one end in contact with the flange of said flanged member and an opposite end including a pair of slots extending therein, said rod extending along the axis of said cylindrical member, said lever arms extending, respectively, through said slots;
- connecting means extending between and secured to the second end of said compression spring and said respective second end of said lever arms.

14. A device as defined in claim 13 wherein said rod has a shoulder thereon.

15. A device as claimed in claim 14 wherein said connecting means includes a pair of wires and a tubular mandrel, said wires connecting said lever arms with said tubular mandrel, and said tubular mandrel being secured to the second end of said compression spring.

16. A device as defined in claim 13 further including first and second rollers mounted to said cylindrical member adjacent each slot, respectively, said rollers contacting said respective lever arms.

17. A tensioning device comprising:
- a rod;
- first and second lever arms pivotably secured at a pivot point to opposite sides of said rod and in criss-crossing relation to each other;
- a compression spring having a first end and a second end;
- a flanged member mounted against the first end of said compression spring;
- a cylindrical member having one end contacting said flanged member and an opposing slotted end through which said lever arms extend, said cylindrical member including contact members contacting said lever arms on a first side of said pivot point; and
- means connecting said second end of said compression spring with said lever arms on a side of said pivot point opposite from said first side.

18. A device as defined in claim 17 wherein said contact members are rollers.

* * * * *